US010333575B2

(12) United States Patent
Duneier et al.

(10) Patent No.: US 10,333,575 B2
(45) Date of Patent: Jun. 25, 2019

(54) SYSTEM AND METHOD FOR DISPLAYING DIGITAL IMAGERY ON A DIGITAL IMAGERY DISPLAY LOCKET

(71) Applicants: Jake Duneier, New York, NY (US); Jennifer Darmour, Seattle, WA (US)

(72) Inventors: Jake Duneier, New York, NY (US); Jennifer Darmour, Seattle, WA (US)

(73) Assignee: Purple Technologies LLC, New York, NY (US)

( * ) Notice: Subject to any disclaimer, the term of this patent is extended or adjusted under 35 U.S.C. 154(b) by 9 days.

(21) Appl. No.: 15/584,802

(22) Filed: May 2, 2017

(65) Prior Publication Data

US 2017/0317705 A1 Nov. 2, 2017

Related U.S. Application Data

(60) Provisional application No. 62/330,565, filed on May 2, 2016.

(51) Int. Cl.
*H04B 1/38* (2015.01)
*H04B 1/3827* (2015.01)
(Continued)

(52) U.S. Cl.
CPC ........... *H04B 1/385* (2013.01); *A44C 15/005* (2013.01); *A44C 15/0015* (2013.01); *A44C 25/004* (2013.01); *G06F 1/163* (2013.01); *G06F 1/1637* (2013.01); *G06F 3/044* (2013.01); *G06F 3/0488* (2013.01); *H02J 7/0052* (2013.01);
(Continued)

(58) Field of Classification Search
CPC ........ G06F 3/0488; G06F 3/044; G06F 1/163; G06F 1/1637; H04W 4/80; H04B 17/23; H04B 1/385; H04B 5/0037; A44C 15/0015; A44C 15/005; A44C 25/004;
(Continued)

(56) References Cited

U.S. PATENT DOCUMENTS 4,912,608 A * 3/1990 Lee .................... A44C 15/0015
362/104
D566,605 S 4/2008 Anand
(Continued)

FOREIGN PATENT DOCUMENTS

DE 202009005521 U1 7/2009

OTHER PUBLICATIONS

International Search Report in PCT/US2017/030624 (dated Jul. 5, 2017).
(Continued)

*Primary Examiner* — Nhan T Le
(74) *Attorney, Agent, or Firm* — Pryor Cashman LLP

(57) ABSTRACT

A digital imagery display locket includes a locket case having a housing and an openable cover attached to the housing, a display configured to display digital imagery on the display secured to the housing and configured to be covered by the cover in a closed position, a processor disposed in the housing and configured to communicate with the display, a memory disposed in the housing and configured to store data used by the processor to create the digital imagery on the display, and a wireless transceiver disposed in the housing and configured to wirelessly receive the data and to communicate the data to the processor.

19 Claims, 25 Drawing Sheets

(51) Int. Cl.
  *A44C 15/00* (2006.01)
  *A44C 25/00* (2006.01)
  *G06F 3/044* (2006.01)
  *G06F 3/0488* (2013.01)
  *H02J 7/00* (2006.01)
  *H04W 4/80* (2018.01)
  *G06F 1/16* (2006.01)
  *H02J 7/02* (2016.01)
  *H04B 5/00* (2006.01)
  *H04M 3/42* (2006.01)
  *H02J 50/10* (2016.01)

(52) U.S. Cl.
  CPC .............. *H04W 4/80* (2018.02); *H02J 7/025* (2013.01); *H02J 50/10* (2016.02); *H02J 2007/0062* (2013.01); *H04B 5/0037* (2013.01); *H04M 3/42178* (2013.01); *H04M 3/42382* (2013.01)

(58) Field of Classification Search
  CPC .......... H02J 7/0052; H02J 50/10; H02J 7/025; H02J 2007/0062
  See application file for complete search history.

(56) References Cited

U.S. PATENT DOCUMENTS

| | | |
|---|---|---|
| 8,548,434 B2 | 10/2013 | Raffle |
| 9,398,790 B1* | 7/2016 | Ketcher ............... A44C 15/005 |
| 9,619,745 B1 | 4/2017 | Chabbott |
| 2004/0140348 A1 | 7/2004 | Fromm |
| 2004/0202052 A1 | 10/2004 | Lev |
| 2006/0047585 A1 | 3/2006 | Lapa et al. |
| 2008/0266210 A1 | 10/2008 | Nonaka |
| 2012/0019488 A1* | 1/2012 | McCarthy ........... G06F 3/03545 345/179 |
| 2014/0288527 A1 | 9/2014 | Francis et al. |
| 2014/0378089 A1* | 12/2014 | Monros .................. H04W 4/90 455/404.2 |
| 2015/0013385 A1 | 1/2015 | Weems et al. |
| 2015/0186092 A1* | 7/2015 | Francis ................. G06F 3/1423 345/520 |
| 2015/0364112 A1* | 12/2015 | Kosann ................... G09G 5/12 63/1.11 |

OTHER PUBLICATIONS

Written Opinion of the International Searching Authority in PCT/US2017/030624 (dated Jul. 5, 2017).

* cited by examiner

SYSTEM AND METHOD FOR DISPLAYING DIGITAL IMAGERY ON A DIGITAL IMAGERY DISPLAY LOCKET

CROSS-REFERENCE TO RELATED APPLICATIONS

The present application claims priority to U.S. provisional application Ser. No. 62/330,565, filed May 2, 2016, the disclosure of which is incorporated herein by reference in its entirety.

FIELD OF THE INVENTION

The present invention relates generally to wearable personal accessories and, in particular, to a system and method for displaying digital imagery on a digital imagery display locket.

BACKGROUND

Traditionally, people have used wearable jewelry such as lockets to keep images of others dear to them. Such lockets provide a physical reminder of individuals important to the locket's wearer, i.e., a keepsake of those individuals. In addition to holding the images of important individuals, these lockets further serve as a personal accessory, namely a piece of jewelry complementing the wearer's style.

Despite the sentimental importance of traditional lockets, such lockets suffer from several limitations. First, only one or two images are generally present in traditional lockets, thus preventing the owner from keeping images of a greater number of important individuals with him or her in the locket. Further, changing the images within traditional lockets typically calls for intricate and intensive manual labor, requiring a significant amount of time and sometimes hiring the services of a professional jeweler.

Accordingly, there is a need for a digital imagery display locket that retains the jewelry and keepsake aspects of a traditional locket, but also allows for keeping, easily uploading, and easily switching between a multitude of images.

SUMMARY OF THE INVENTION

In general, in one aspect, the invention features a digital imagery display locket including a locket case having a housing and an openable cover attached to the housing, a display configured to display digital imagery with the display secured to the housing and configured to be covered by the cover in a closed position, a processor disposed in the housing and configured to communicate with the display, a memory disposed in the housing and configured to store data used by the processor to create the digital imagery on the display, and a wireless transceiver disposed in the housing and configured to wirelessly receive the data and to communicate the data to the processor.

Implementations of the invention may include one or more of the following features. The locket may further include a power supply disposed in the housing and configured to supply power to the display. The locket may also further include charging means disposed in the housing and configured to charge the power supply. The charging means may be an induction coil, an interface configured to charge via a wired connection to a power source, an interface configured to charge via a USB cable, or an interface configured to charge via a held charge disconnected from a power source. The display may include a capacitive touch-screen interface for interacting with the digital imagery. The cover may have an outwardly-bended lip and an inner surface comprising a reflective material. The cover may also have an inner surface and an outer surface, with the inner surface including indentations of sufficient depth to permit light from the display to be visible on the outer surface when the cover is in the closed position. The locket may further include a chain, where the housing includes an indentation and a bar spanning the indentation and where the chain is fitted between the indentation and the bar. The wireless transceiver may be configured to wirelessly receive the data from a smartphone, a tablet computer, a laptop, or a mobile device capable of wireless communication and downloadable software application execution. The wireless transceiver may be configured to wirelessly receive the data via a Bluetooth® standard.

In general, in another aspect, the invention features a system including an external device capable of wireless communication and downloadable software application execution and a digital imagery display locket including a locket case having a housing and an openable cover attached to the housing, a display configured to display digital imagery with the display secured to the housing and configured to be covered by the cover in a closed position, a processor disposed in the housing and configured to communicate with the display, a memory disposed in the housing and configured to store data used by the processor to create the digital imagery on the display, and a wireless transceiver disposed in the housing and configured to wirelessly receive the data from the external device and to communicate the data to the processor.

Implementations of the invention may include one or more of the following features. The locket may further include a power supply disposed in the housing and configured to supply power to the display. The locket may also further include charging means disposed in the housing and configured to charge the power supply. The charging means may be an induction coil, an interface configured to charge via a wired connection to a power source, an interface configured to charge via a USB cable, or an interface configured to charge via a held charge disconnected from a power source. The display may include a capacitive touch-screen interface for interacting with the digital imagery. The external device may be a smartphone, a tablet computer, a laptop, or a mobile device capable of wireless communication and downloadable software application execution. The locket may be configured to wirelessly receive the data from the external device via a downloadable software application executed by the external device. The locket may also be configured to permit a user to interact with the digital imagery displayed on the display via the downloadable software application.

In general, in another aspect, the invention features a method of displaying digital imagery on a digital imagery display locket including wirelessly transmitting data from an external device to a digital imagery display locket and displaying the data as digital imagery on a display of the digital imagery display locket, where the external device is capable of wireless communication and downloadable software application execution and the digital imagery display locket includes a locket case having a housing and an openable cover attached to the housing, a display configured to display digital imagery with the display secured to the housing and configured to be covered by the cover in a closed position, a processor disposed in the housing and configured to communicate with the display, a memory disposed in the housing and configured to store data used by the processor to create the digital imagery on the display, and a wireless transceiver disposed in the housing and configured to wirelessly receive the data from the external device and to communicate the data to the processor.

Implementations of the invention may include one or more of the following features. The locket may be configured to wirelessly receive the data from the external device via a downloadable software application executed by the external device. The locket may also be configured to permit a user to interact with the digital imagery displayed on the display via the downloadable software application.

Other embodiments of the present invention will become readily apparent to those skilled in the art from the following detailed description. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
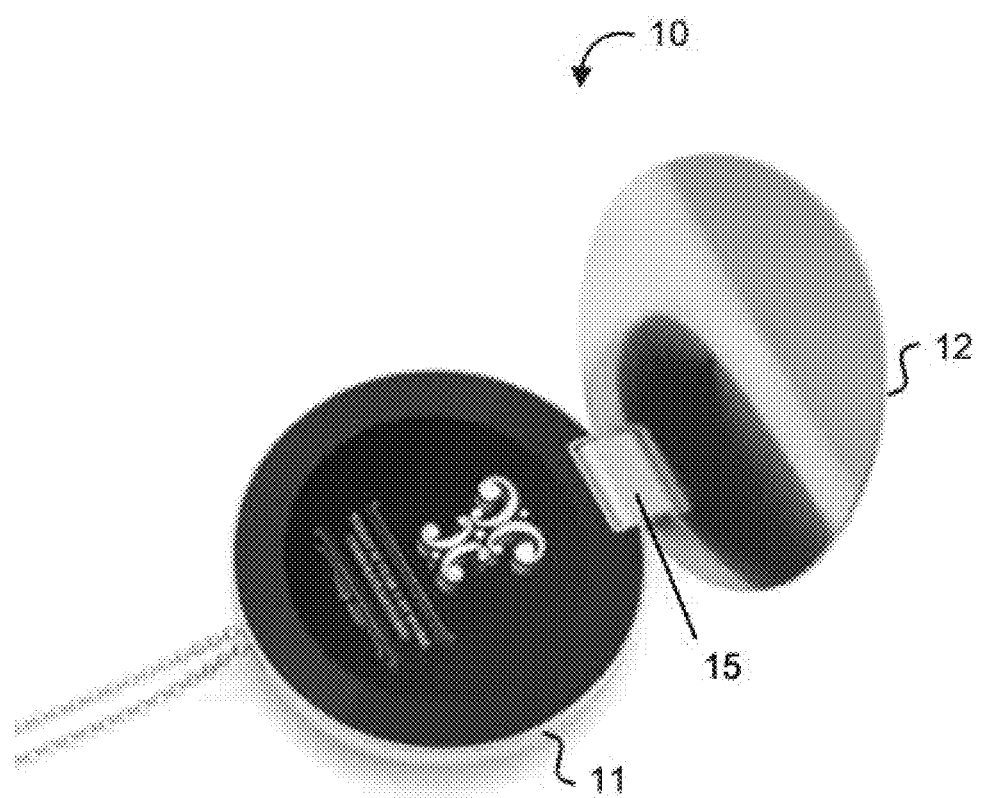
FIG. 1 show a locket of the present invention with an open cover and chain attached in accordance with a first embodiment.
Figure 10:
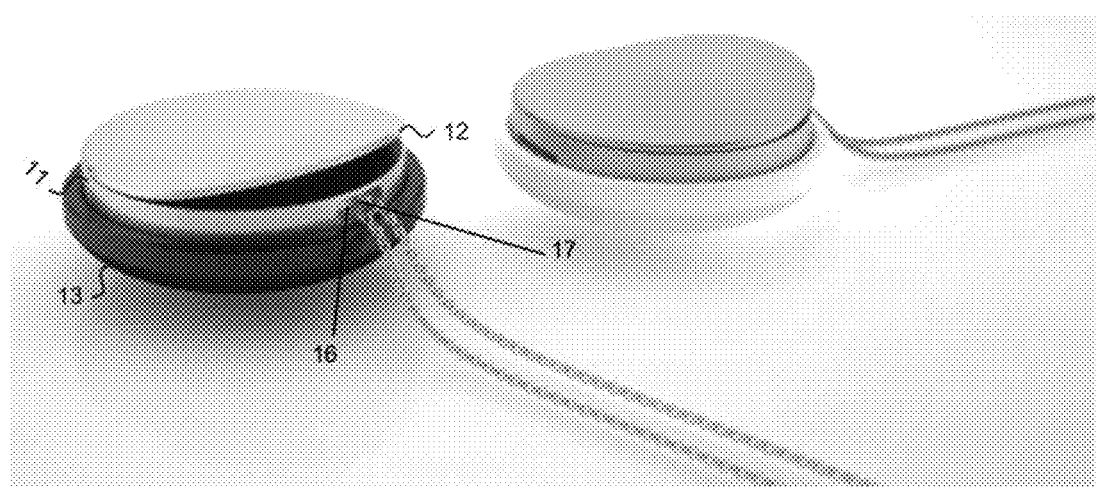
FIG. 10 shows a locket of the present invention inserted into a charger.

FIG. 1 shows display locket 10, in accordance with one embodiment of the present invention. The locket 10 includes a full color LCD display that may support display of images and animation, such as images of several individuals' faces. The display includes a capacitive touchscreen interface that responds to a user's touch so that the user may interact with the images and animation. Attached to the housing 11 of the locket is an openable cover 12 that covers the image when closed. The cover 12 is shown as being hingedly or rotatably attached to the body on a hinge, though other ways to attach the cover are possible. The locket hinge 15 is preferably designed such that the hinge mechanism is inside the outer silhouette of the locket; in this manner, the hinge is not seen when viewing the locket from the front or the back. The cover may be removable as well. The locket 10 is also attached to a chain so that the locket may be worn as a necklace. The mechanism that holds the chain to the locket may be disposed inside the outer silhouette of the locket so that it is not visible when viewing the locket from the front or the back; this may be accomplished through an indentation 16 in the body of the locket in which the chain may fit and a bar 17 spanning the indentation through which the chain is threaded, as illustrated in FIG. 10.

Figure 7A:
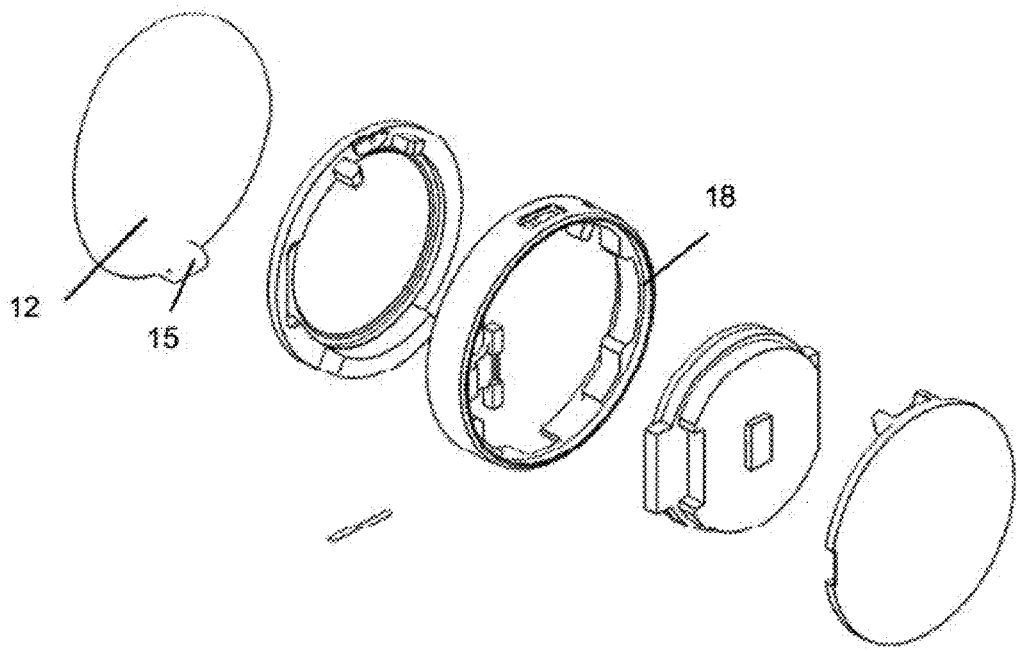
FIG. 7A shows a back exploded view of a locket of the present invention.
Figure 7B:
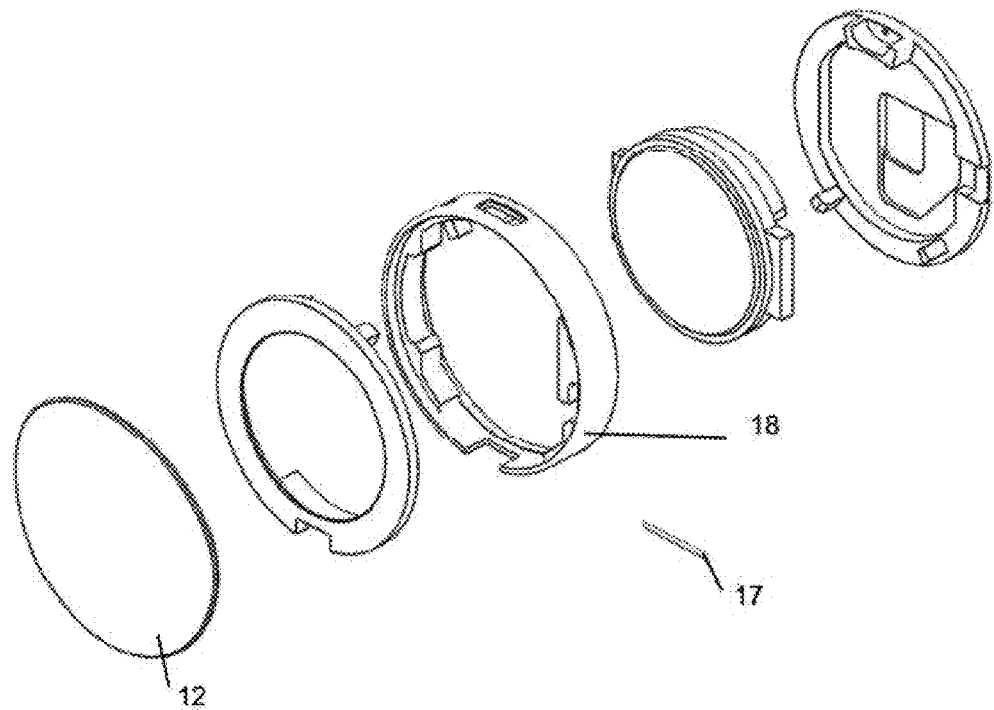
FIG. 7B shows a front exploded view of a locket of the present invention.

In one embodiment, the user may change the cover 12 and bezel 18 of the invention, as illustrated in FIGS. 7A and 7B, as he or she pleases. In some embodiments, the user may easily pull or snap a removable, outer metal shell off of the locket's base and replace it with a new cover and bezel design. He or she may also remove the cover and similarly replace it with a new cover design; this feature gives the user the ability to change the finish, material, and cover design to fit his or her preference.

Figure 2:
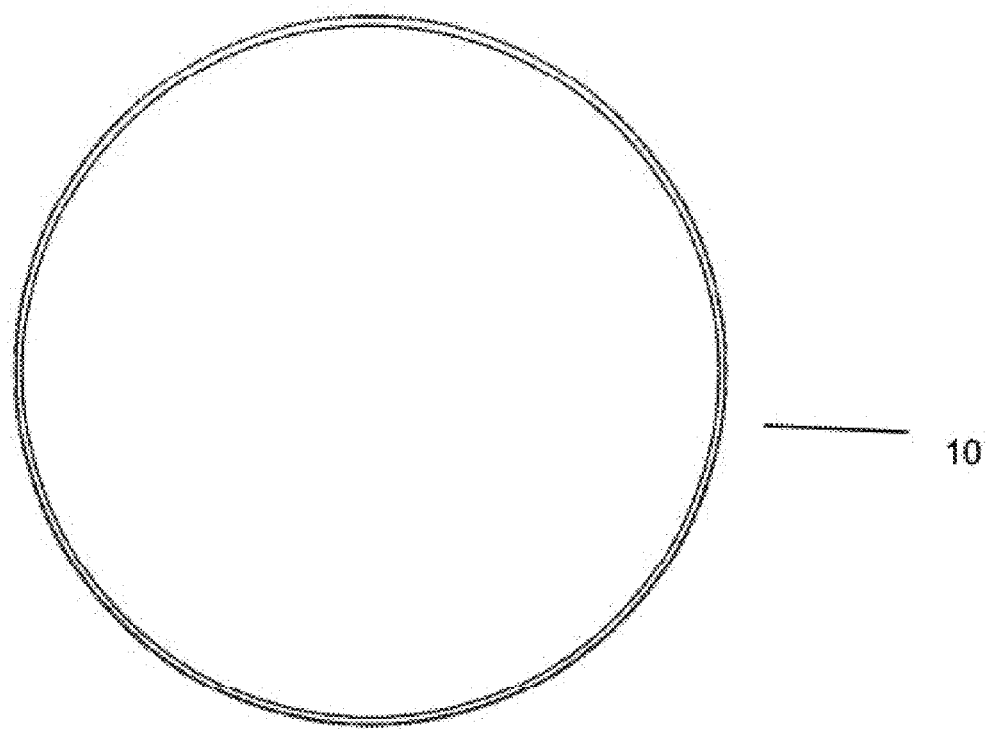
FIG. 2 shows a front view of the locket of the first embodiment.
Figure 3:
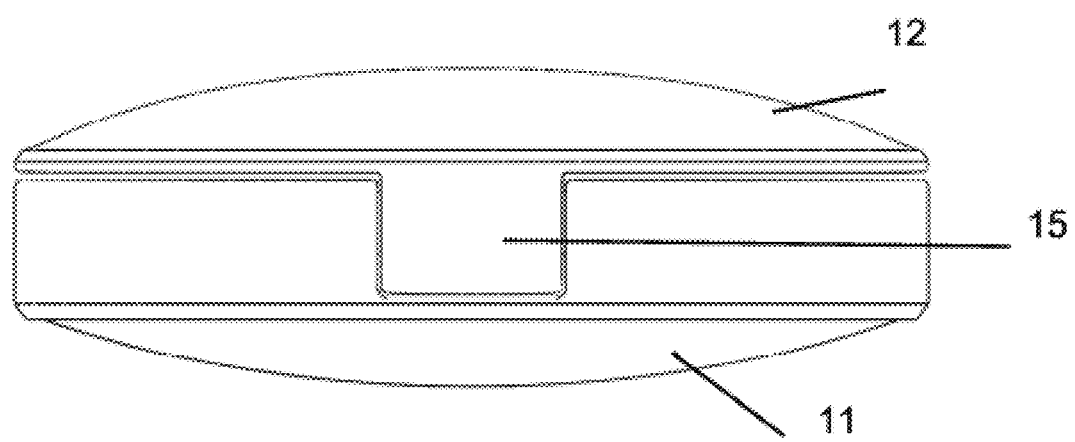
FIG. 3 shows a bottom view of the locket of the first embodiment.
Figure 4:
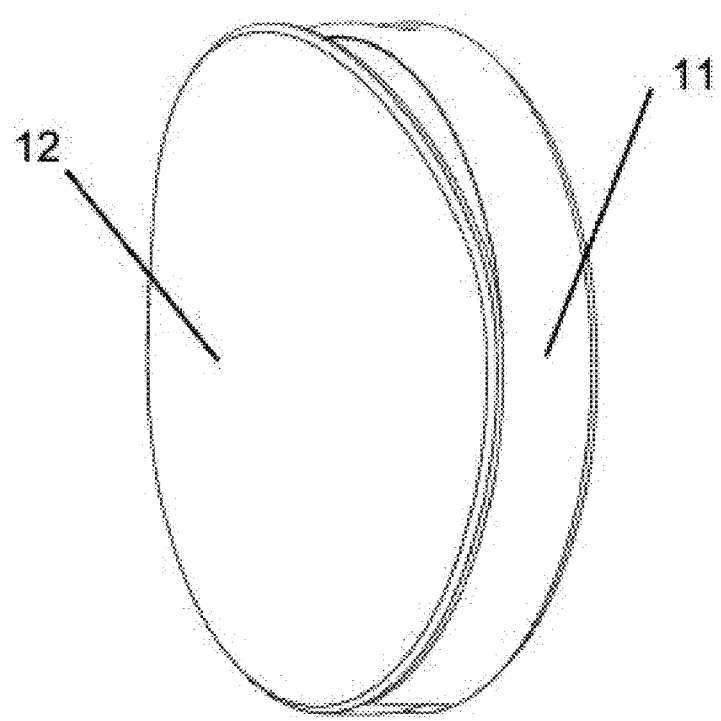
FIG. 4 shows a side perspective view of a locket of the present invention with the cover attached and closed in accordance with a second embodiment.
Figure 5:
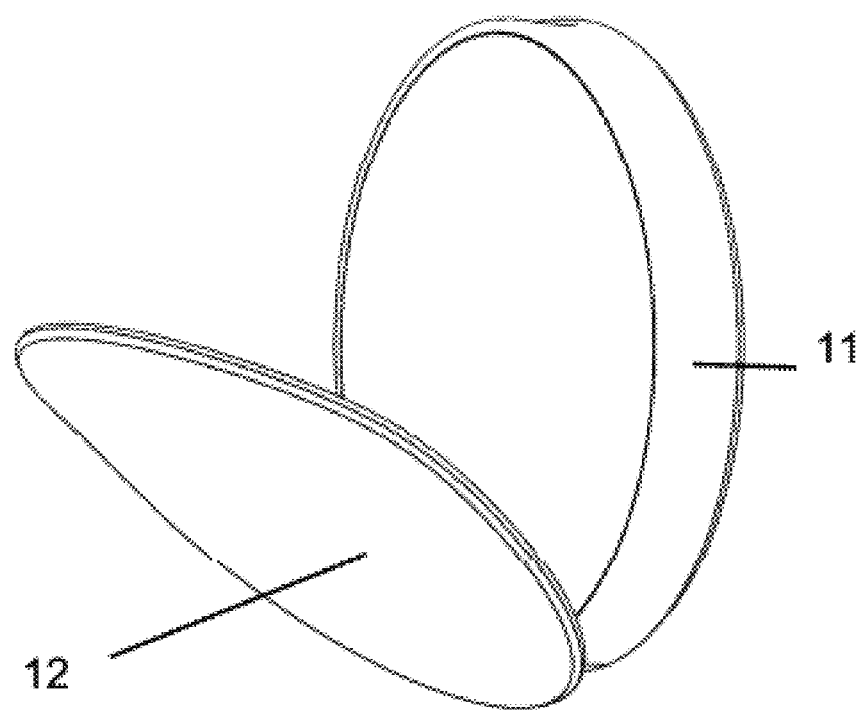
FIG. 5 shows a side perspective view of the locket of the second embodiment with the cover attached and open.
Figure 6:
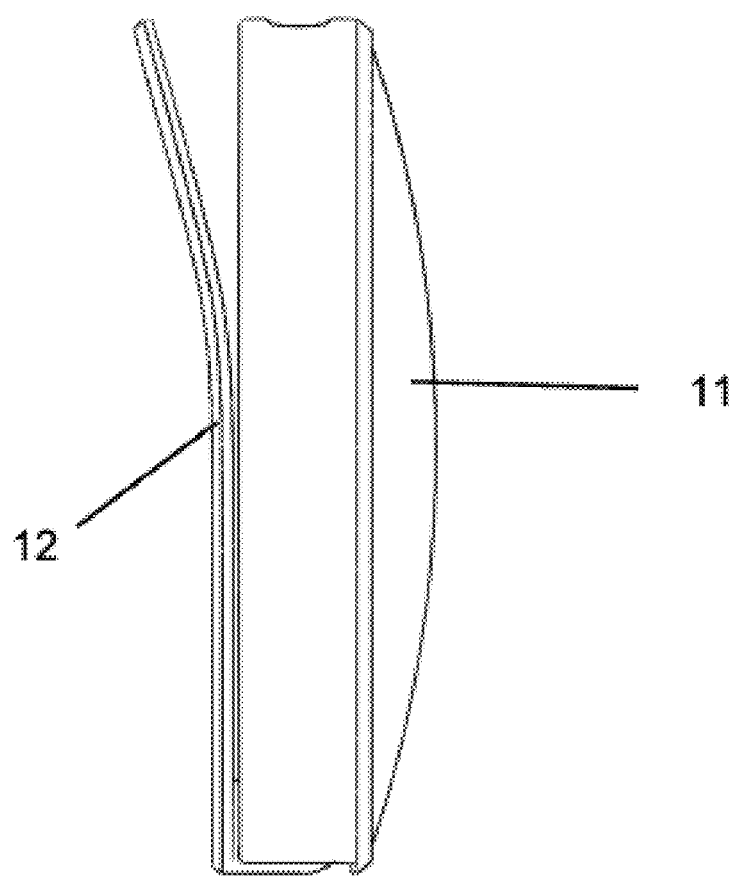
FIG. 6 shows a side view of the locket of the second embodiment with the cover closed.

FIG. 2 shows a front view of the locket of FIG. 1, with the cover closed, in accordance with one embodiment. FIG. 3 shows a bottom view of the same locket. The cover 12 may include a lip that bends outwardly from the locket when the cover is closed, as illustrated in FIGS. 4, 5, and 6. The inner surface of the cover 12 facing the displayed image may be made of a reflective or highly polished material, and when the image is displayed on the LCD display, a reflection of a portion of the image appears on the lip and is visible to a wearer of the locket. When a new image is displayed on the locket 10, flashes of light may be emitted by the display, with the flashes being reflected from the lip and towards the eyes of the wearer to alert the wearer of the display of a new image. In one embodiment, the cover may include precious stones such as diamonds set in holes through the cover that allow light from the display to shine through the stones, making the stones glow. In the description below, the terms "user" and "wearer" are used interchangeably.

Figure 8:
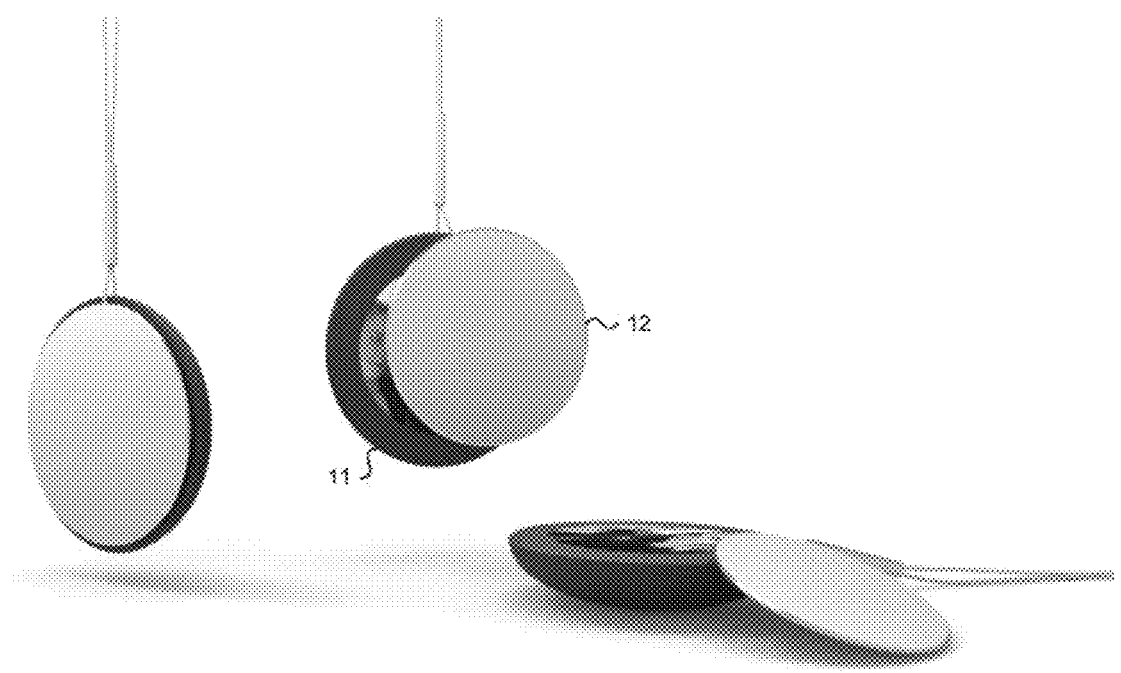
FIG. 8 shows a locket of the present invention with the cover opened and dangling in accordance with a third embodiment.

Alternatively, the cover may not be directly attached to the housing 11 of the locket, but may dangle from an attachment to which the housing is also attached, such as a chain, cord, or another object that connects the wearer to the locket. Such an embodiment is illustrated in FIG. 8.

Figure 9:
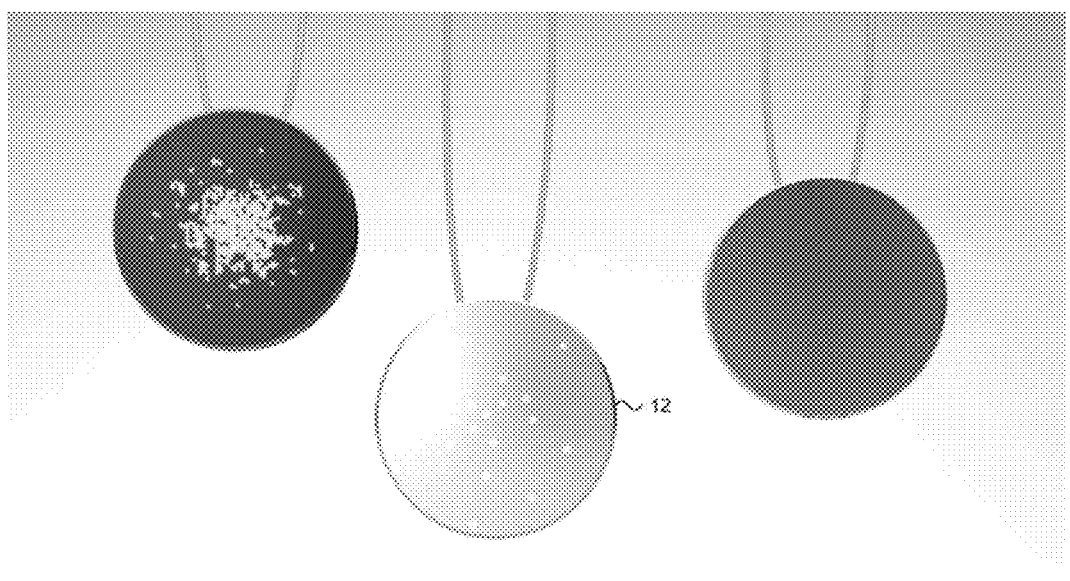
FIG. 9 shows a locket of the present invention with light flashed from the display appearing on the outer surface of the cover when the cover is in a closed position in accordance with a fourth embodiment.

The inner surface of the cover 12 facing the display may be partially perforated, creating indentations within the cover. The perforations may not be visible when light from the display is not flashed; however, when light from the display is flashed, the light hits the perforations and may appear on the outer surface of the cover 12 facing away from the display, which may alert the wearer to the receipt of a new message. FIG. 9 shows light flashing from the display appearing on the outer surface of the cover in accordance with one embodiment. Depending on the pattern of the indentations, the flashes of light may appear in different patterns on the outer surface of the cover.

The housing 11 of the locket includes a power supply, e.g., battery, and an induction coil serving as charging means for the power supply to inductively charge when placed physically close to another electromagnetic coil. The exterior of the body of the coil may be made of a nonferrous material that allows an electromagnetic field to pass through, such as ceramic or plastic, though other materials and other kinds of power sources are possible. FIG. 10 shows the locket of FIG. 1 when inserted into a charger 13, in accordance with one embodiment. The charger 13 includes a second coil that passes electromagnetic energy to the induction coil included in the locket. Other shapes of the charger 13 and the locket 10 are possible. For example, in a further embodiment, the locket 10 may include an interface for charging via a wired connection to a power source. In another example, the locket 10 may include a USB interface that allows the locket to be charged using a USB cable. In another example, a charger may charge itself while charging the locket 10 such that the charger holds a charge after being disconnected from a power source and can charge the locket 10 without being connected to a power source. Other ways to charge the locket are possible as well.

Internal to the housing 11, the locket 10 includes a processor, operating under programmable control and configured to communicate with the display; a memory within which to store data used by the processor to create the digital imagery on the display, including images and program instructions that may be implemented as modules; and a wireless transceiver capable of wireless communication with devices such as mobile phones, including capabilities of wirelessly receiving data and communicating this data to the processor. The locket is preferably connected to an application via connection to a user device. This application controls the settings and display of the locket as well as provides a synchronized display for the mobile device if the user so chooses.

Figure 11:
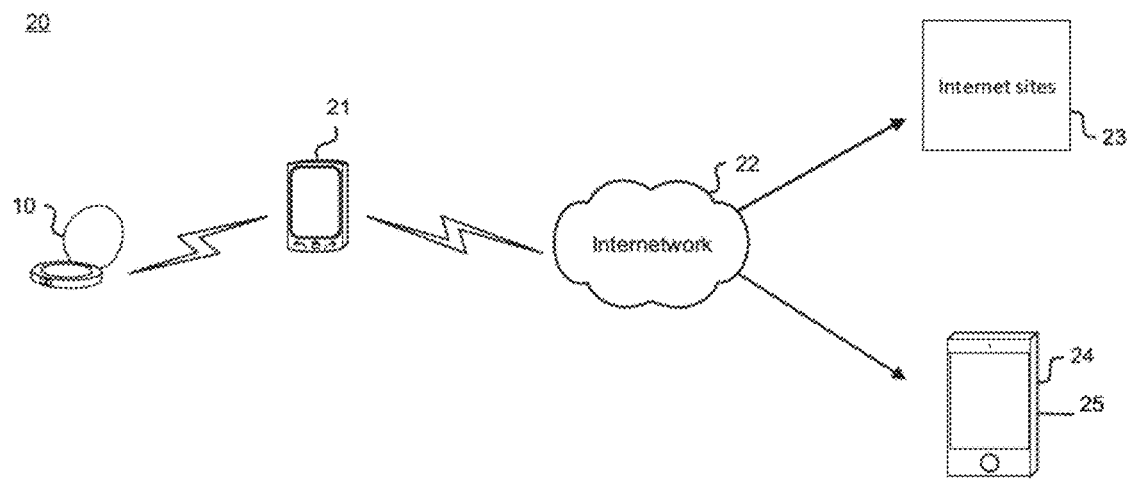
FIG. 11 is a diagram illustrating a computer-implemented system for creation and manipulation of keepsakes displayed on a digital imagery display locket.

FIG. 11 is a diagram illustrating a computer-implemented system for the creation and manipulation of keepsakes displayed on a digital imagery display locket, in accordance with one embodiment. As mentioned above, the locket 10 includes a wireless transceiver that may communicate with a mobile device 21, such as a smartphone, tablet computer, laptop, or any other mobile device capable of wireless communication and of executing downloadable software applications. In one embodiment, the wireless transceiver communicates with the mobile device via the Bluetooth® standard, although other ways of wireless communication are possible. The mobile device 21 executes a downloadable software application that communicates via a network 22, such as the Internet or a cellular network, with one or more Internet sites 23 such as Instagram®, Facebook®, and any other site with user-generated content. In addition, the application may communicate with user devices 24, which may include devices of other users of the downloadable application, as well as devices of people sending content to the locket wearer via SMS messages, e-mail messages, and Instant Messages.

Figure 18:
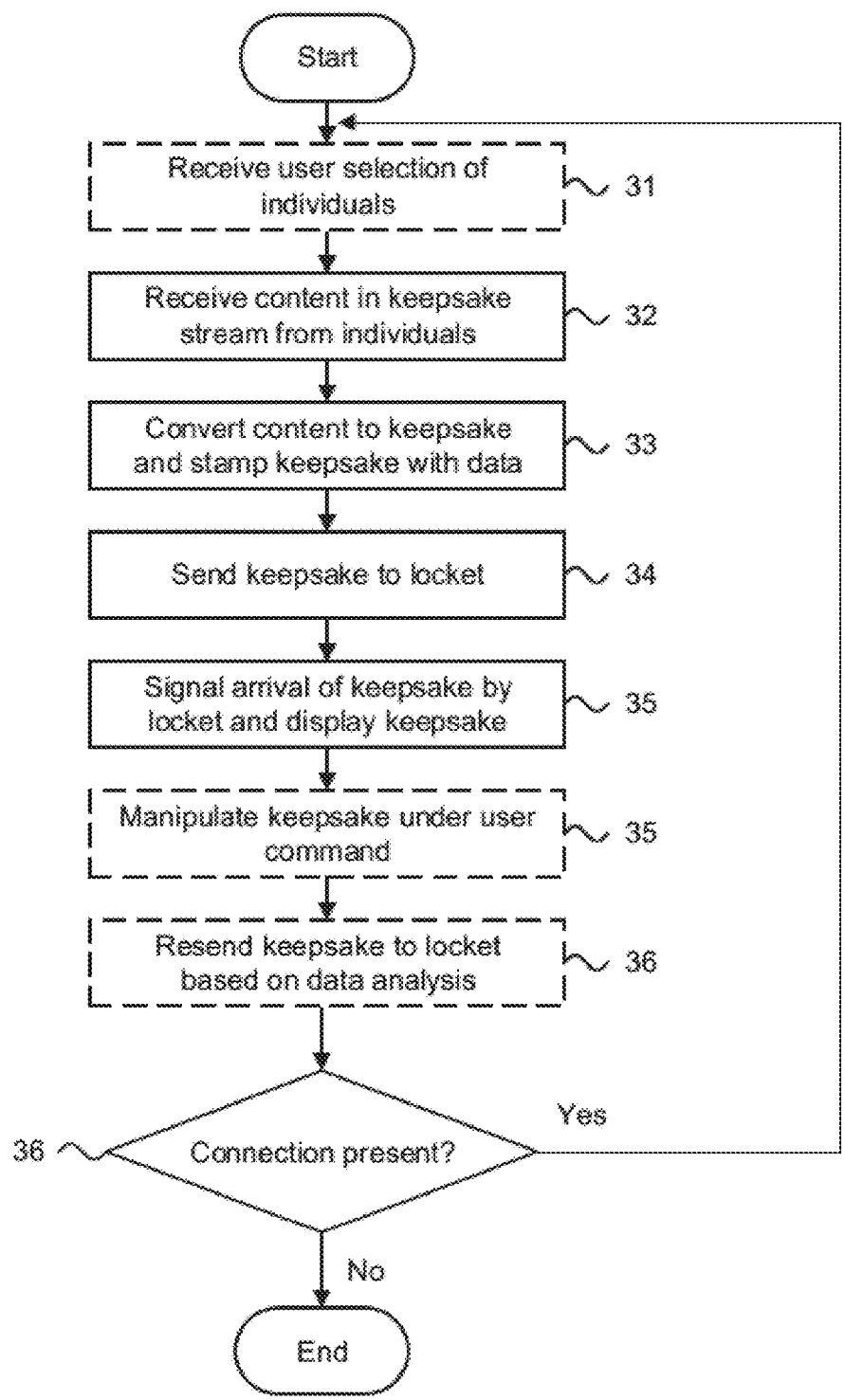
FIG. 18 is a flow diagram showing a computer-implemented method for creation and manipulation of keepsakes displayed on a digital imagery display locket.

As further described below with reference to FIG. 18, the application allows a user to interact with the displayed keepsake, including by permitting the user to select, via mobile device 21, individuals whose content is received by the application, such as by a social networking post or a message sent directly to the mobile device 21 of the user. The application also has categories of services that a user may choose to allow him or her to keep track of his or her favorite things, individuals, and groups. For example, the application allows the user to choose a person, place or thing that he or she is passionate about such as current event topics, sports teams or favorite athletes, celebrities, geographical locations, hobbies, etc. These selections may also be people who are significant to the user, such as friends and family. The user can receive personal messages about these individuals and groups to keep up to date with them as well. A user may also connect to a news service that monitors news items that are published around the selected people, places or things. If a new article is published, the application sends a notification to the locket in the form of a display. Viewing the display on the application provides the user with more information on the article and a link to the article. Once selected, the application automatically converts content received from these individuals or organizations into "keepsakes" or images that include processed content received from the selected individuals. The application wirelessly sends these images to the locket 10, where they are stored on the locket 10 and displayed on the display. In particular, the application receives content posted by the selected individuals on social networking services such as Facebook®, Instagram®, or sent by the individuals in other ways, such as via an SMS message, e-mail, or Instant Messages, or through the same mobile application running on the user devices 24 associated with the selected individuals. The aggregated content is turned into the keepsakes, as further described with reference to FIG. 18, such as by applying visual filters to the images in the content and typographic filters to the text in the content. By focusing on individuals, groups, and things rather than a particular source of content, the application organizes the user experience around what is important to the user. When the keepsake is received, the application may alert the user by flashes of light, as described above, although other ways to provide the signal are possible. Keepsakes based on content received from different individuals may be signaled in different ways. For example, different sequences of light and flashes of different duration may be displayed to indicate different individuals. Similarly, if the cover of the locket is perforated, different patterns of light may be presented on the external surface of the cover by shining light only at some of the perforations. Likewise, light of different colors may be used for different individuals. Still other ways to differentiate between the signals are possible.

The locket may also include Bluetooth® Low Energy (LE), which is used to determine proximity to another Bluetooth® LE device, including another locket. For example, if two lockets are within a specified range of one another, a designated action may occur. One example of an action is exchanging images, making it easy for friends and loved ones to share special moments saved on their lockets.

In addition, the application may obtain additional information about the keepsakes and the user and other individuals with which the user is connected. The application may obtain contextual information about the user, individuals connected to the user, and the keepsakes from various sources. For example, the application may use features available in integrated services such as Facebook® and Instagram® to associate additional information of the user who sent the keepsake, such as the user's birthday, anniversary, and special events, with the keepsake.

As further described below with reference to FIG. 18, when content from individuals connected to the user arrives, such as via an SMS message or a Facebook® post, the application may stamp the keepsake created from that content with various information obtained from the mobile device or other sources, such as the time of arrival of the content, the location of the user when the content was received, which may be obtained from a GPS tracker of the mobile device, biometric information of the user such as heart rate at the time the content was received, and an identifier such as a name of the person from whom the message arrived. In a further embodiment, the location and other information of the sender of the content may also be stamped on the content.

The information stamped on the image and the information obtained from the user and/or social networks may be analyzed to determine appropriate times to redisplay keepsakes. For example, information inputted by the user or available on services such as Facebook® determines important events and the application may use particular keepsakes as reminders of these events, possibly by featuring people associated with them. Similarly, if the user is in a location where he or she has previously received a keepsake earlier, the same keepsake may be selected and displayed to the locket as a reminder of the previous visit to that location.

The locket may also include biometric sensors that may determine mood, such as Galvanic Skin Response (GSR), heart rate, and motion. Each time the locket is held to view the display, the sensors detect the person's mood and tags photos based on that mood. If an extreme mood is detected such as sadness, the locket automatically organizes photos based on the mood. For example, if the locket detects that the user is sad, the locket will automatically go into a temporary mode that filters keepsakes to show moments expected to make the user happy. This occurs temporarily to help correct mood, after which the locket returns to its normal state.

A keepsake that is displayed on the locket 10 may also simultaneously be displayed in full view on the application 25 of the mobile device 21. Thus, the locket 10 may act as a remote control for the application's 25 home screen, with the keepsake that is displayed on the locket 10 also automatically displayed on the home screen of the application 25. Other keepsakes may be subsequently selected by the user for display by the application 25 by navigating away from the home screen.

Figure 12A:
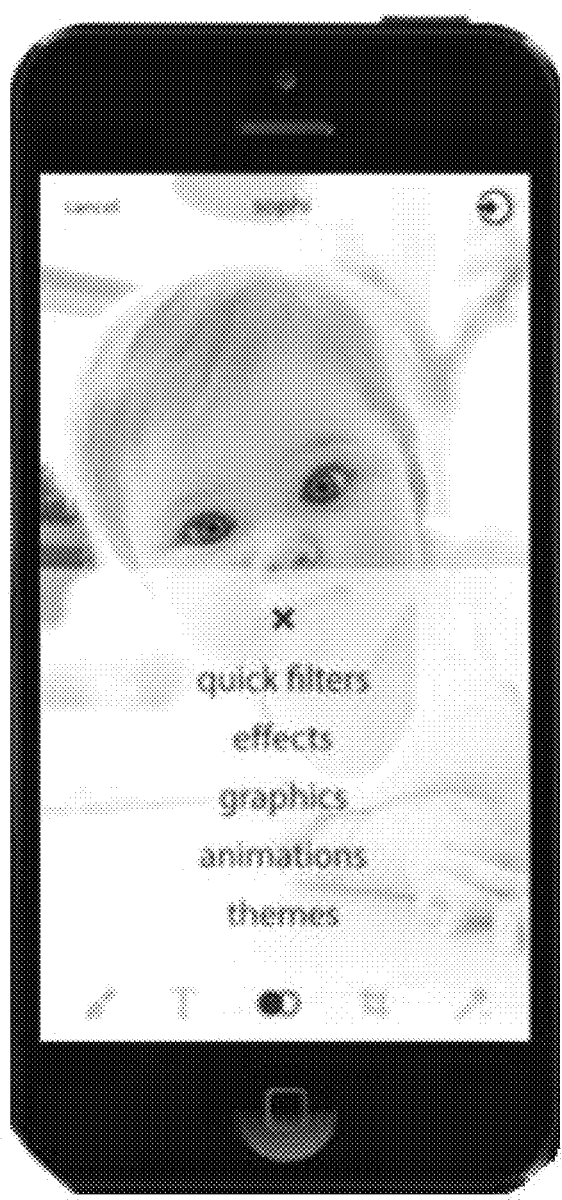
FIGS. 12A and 12B show a user interface of an application on a user mobile device for customizing keepsakes.
Figure 12B:
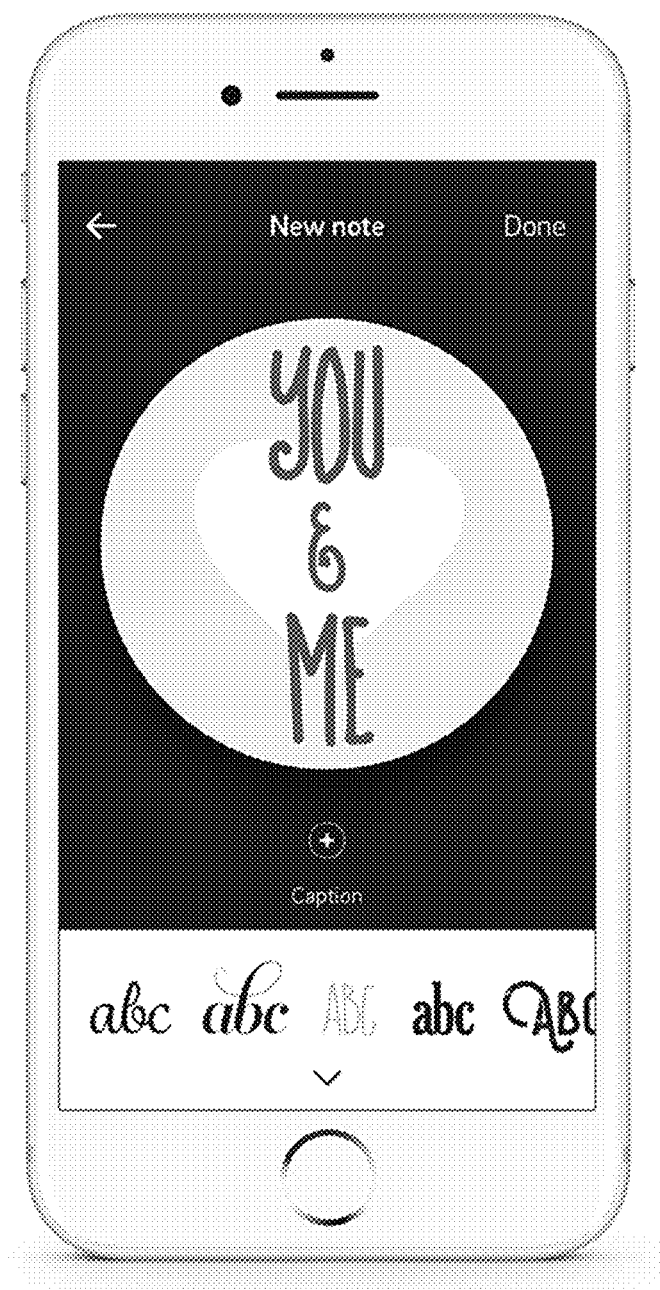
Figure 13A:
FIGS. 13A, 13B, 13C, 13D, 13E, and 13F show a user interface of an application on a user mobile device for manipulation, management, and creation of keepsakes.
Figure 13B:
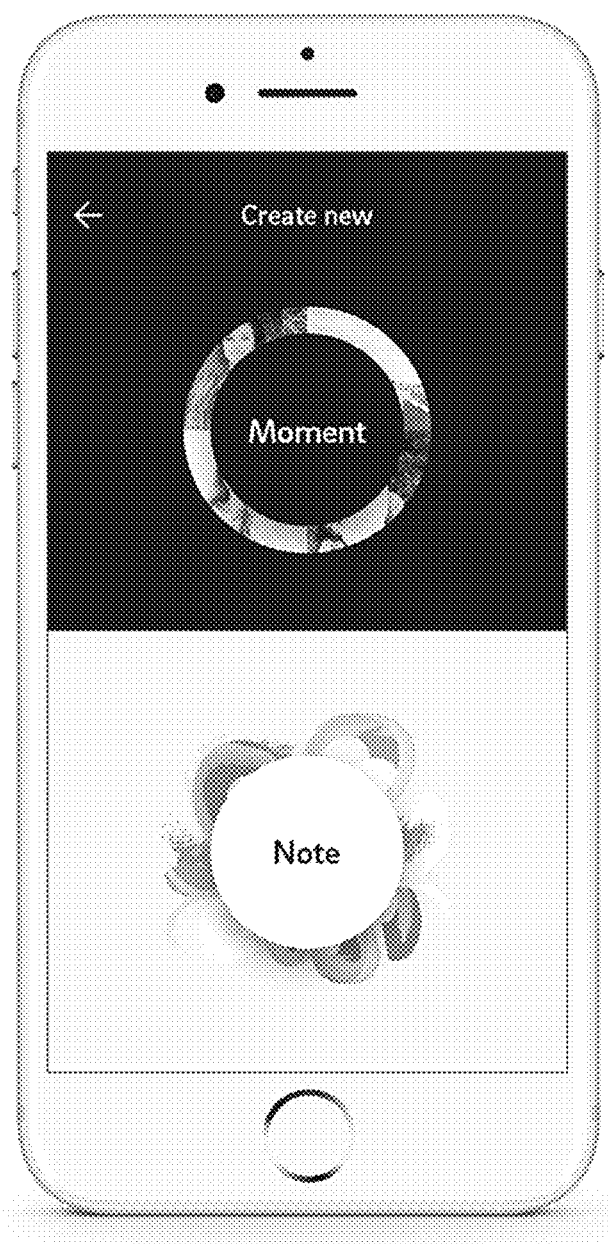
Figure 13C:
Figure 13D:
Figure 13E:
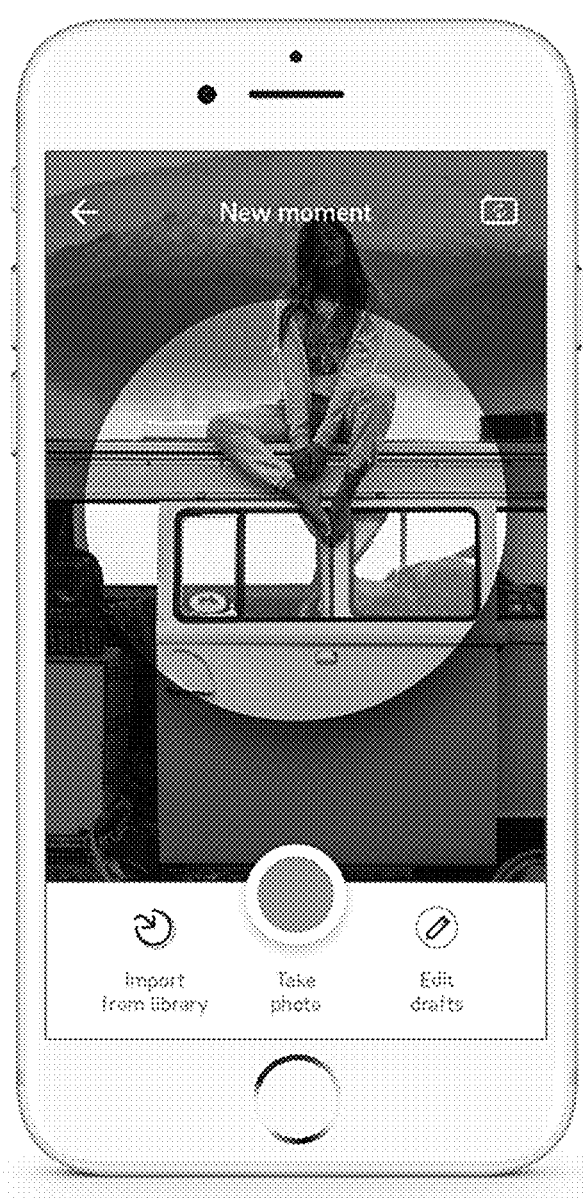
Figure 13F:
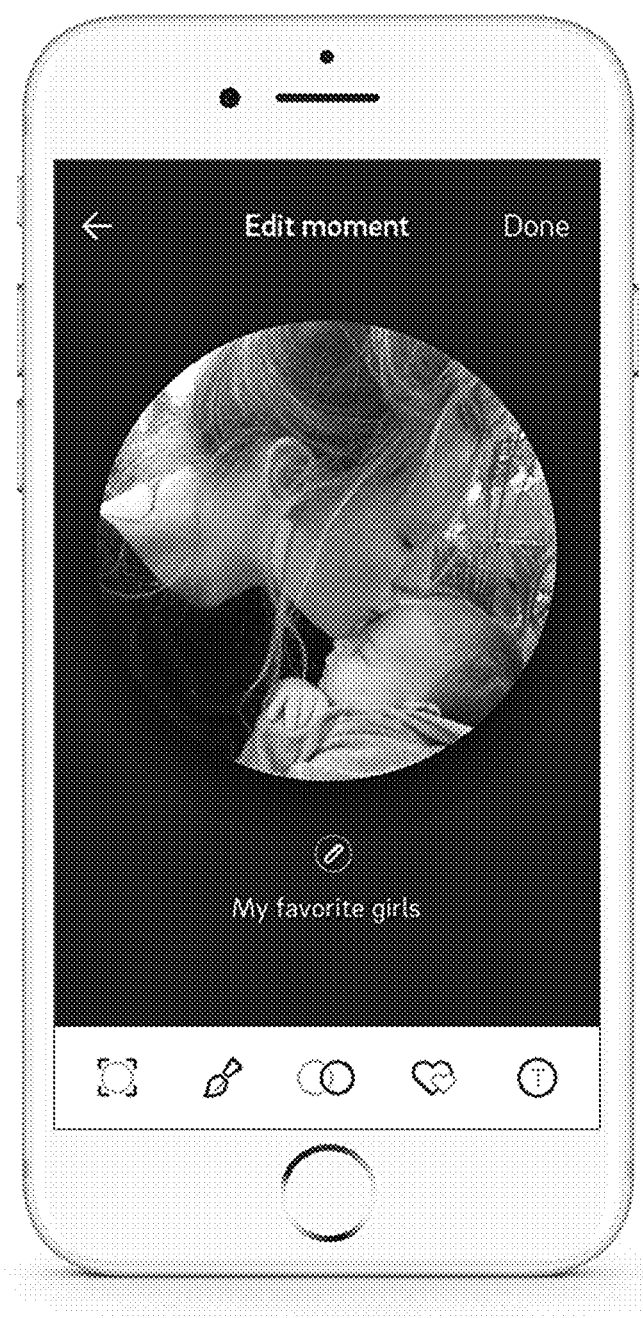

In addition, while the creation of a keepsake by the application may be completely automatic, the application further allows the user to customize each received keepsake on the mobile device. FIGS. 12A and 12B show a user interface of the application for customizing keepsakes, in accordance with one embodiment. As mentioned above, the user interface is synced with the locket and displays the same keepsake displayed on the locket. In a further embodiment, the interface allows the user to select a different keepsake for manipulation. The keepsake is displayed in full screen on the application, allowing the user to view the entire image. If the mobile device includes a touchscreen interface, the application allows the user to use natural gestures to position the image within the keepsake circle, add filters to be applied to the keepsake, and select additional effects to make the keepsakes even more special. In addition, the user may select templates to be used as part of the keepsake, such as a border to be included around an image used in the keepsake. In addition, through the user interface, the user may add new text or graphics not originally included in the keepsake content and move the text and/or graphics to a desired position on the keepsake and in a desired typographic font.

In addition, the application further allows a user to view all of the keepsakes saved by the user and shared by other users. FIGS. 13A-13F show a user interface for manipulation, management, and creation of keepsakes, in accordance with one embodiment. In particular, the application allows the user to select and order the keepsakes that the user wants to appear on the locket. In addition, the application allows the user to create new keepsakes many different ways, such as based on images taken by the user using the mobile device or images downloaded by the user to the mobile device. Also, the user interface allows users to delete keepsakes.

Figure 14A:
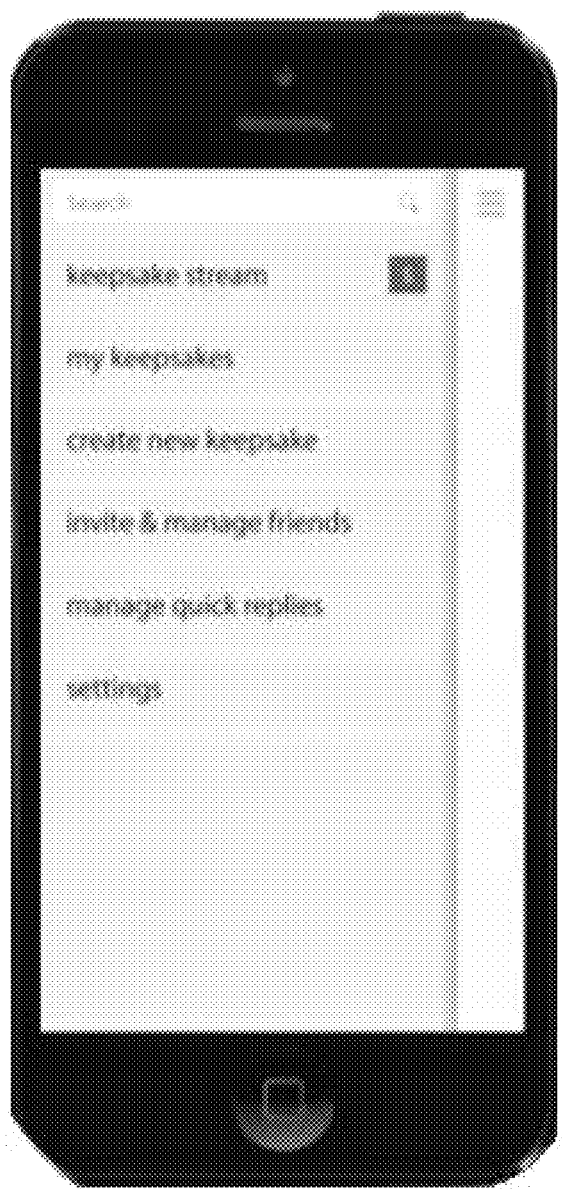
FIGS. 14A and 14B show a user interface of an application on a user mobile device for managing received keepsakes, the individuals from whom the keepsakes are received, and other settings of the application.
Figure 14B:

In general, the application gives the user full control over the keepsake experience, including with whom the user is connected, which keepsakes are shared, and how they are shared. For example, FIGS. 14A and 14B show a user interface for managing received keepsakes, the individuals from whom the keepsakes are received, and other settings of the application, in accordance with one embodiment. In particular, the application includes a home screen with a menu button. Selecting the menu button will present for selection the area that the user wants to manage or organize. The information regarding the selected area is presented to the user as well, allowing the user full control over the content and experience associated with the application.

Figure 15:
FIG. 15 shows a portion of a user interface of a locket of the present invention for interacting with a displayed keepsake.

While the application provides the user with a way to organize and customize the received keepsakes, the touchscreen display of the locket allows the wearer to interact with the keepsake, such as by directly managing the keepsakes displayed on the locket. FIG. 15 shows a portion of the user interface of the locket for interacting with a displayed keepsake, in accordance with one embodiment. The user interface allows managing the images through simple gestures of the user. For example, tapping the keepsake displayed on the locket display brings up available actions available for the display. An additional tap may select one of the presented actions, such as sending a pre-set response, e.g., a "kiss" response, or a "quick reply" pre-formed response to the keepsake's sender. The content of the quick reply may be customized on the application. The user may view a list of all available replies by scrolling through the quick replies via motions of one or more fingers. Finally, tapping one of the replies may select and send the reply to the person from whom the content of the keepsake originated. The quick reply action may leverage the "quick reply feature" available on the Android Wear™ platform, though other platforms may also be used. The selected reply is wirelessly transmitted to the application and may be sent by the application via the same medium by which the keepsake content was received, such as a social networking site including Facebook® or a different medium such as via an SMS message. The quick reply action presents the user with a simple way to show people important to the user that the user thinks about them without having to laboriously type on a small screen.

Figure 16:
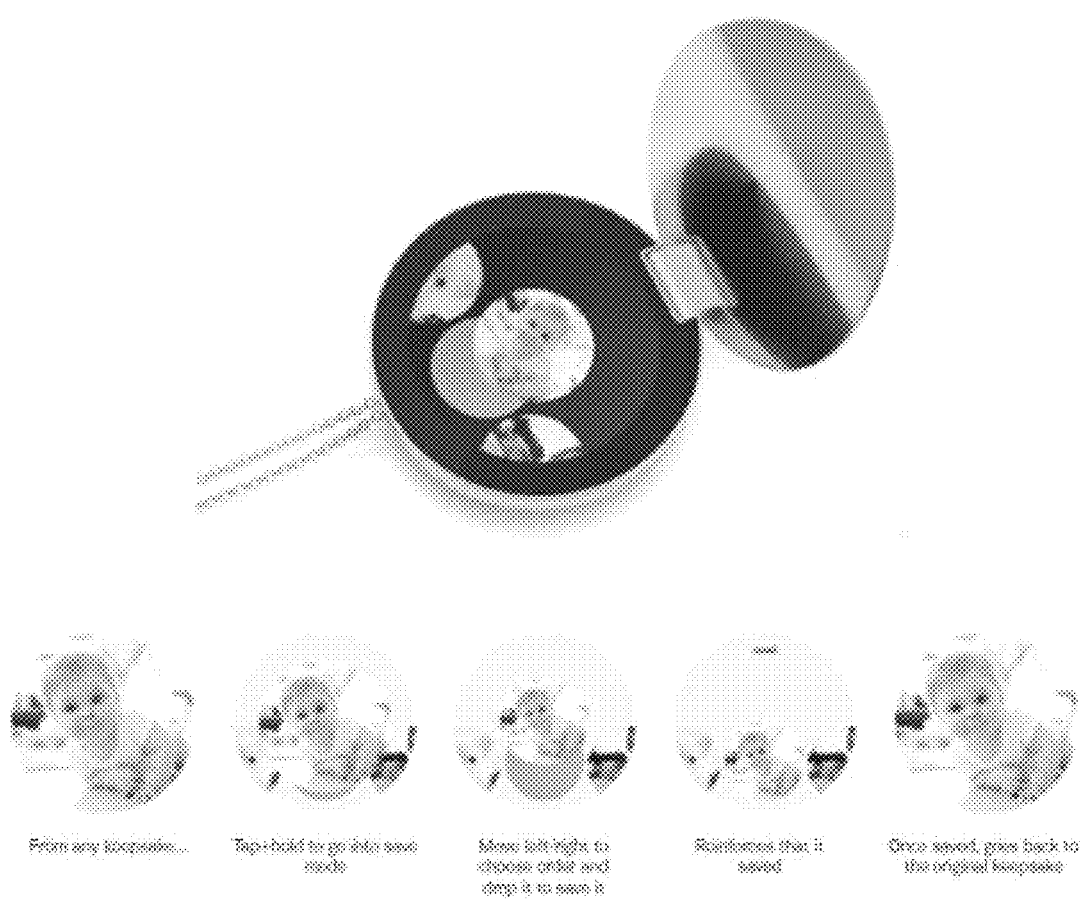
FIG. 16 shows a portion of a user interface of a locket of the present invention for saving a keepsake.

Similarly, the interface allows the user to save a displayed keepsake onto the displayed locket using gestures. FIG. 16 shows a portion of the user interface of the locket may be used for saving an image, in accordance with one embodiment. For example, for any keepsake in the user's keepsake stream, tapping and/or holding the user's finger on the display may switch the locket into the "management mode," which allows the user to save the keepsake. The displayed keepsake is reduced in size and the user may use finger gestures to move between different keepsakes saved on the display. Dragging and dropping the keepsake to the bottom of the screen with finger gestures will save the keepsake. Alternatively, a menu may appear as an overlay on the keepsake, which may fade to the background of the display image. A user may click on a heart icon to save, or "cherish," the keepsake. A notice that the keepsake is saved may appear on the screen. Once saved, the keepsake that was displayed when the locket went into the "management mode" will be displayed again.

Figure 17:
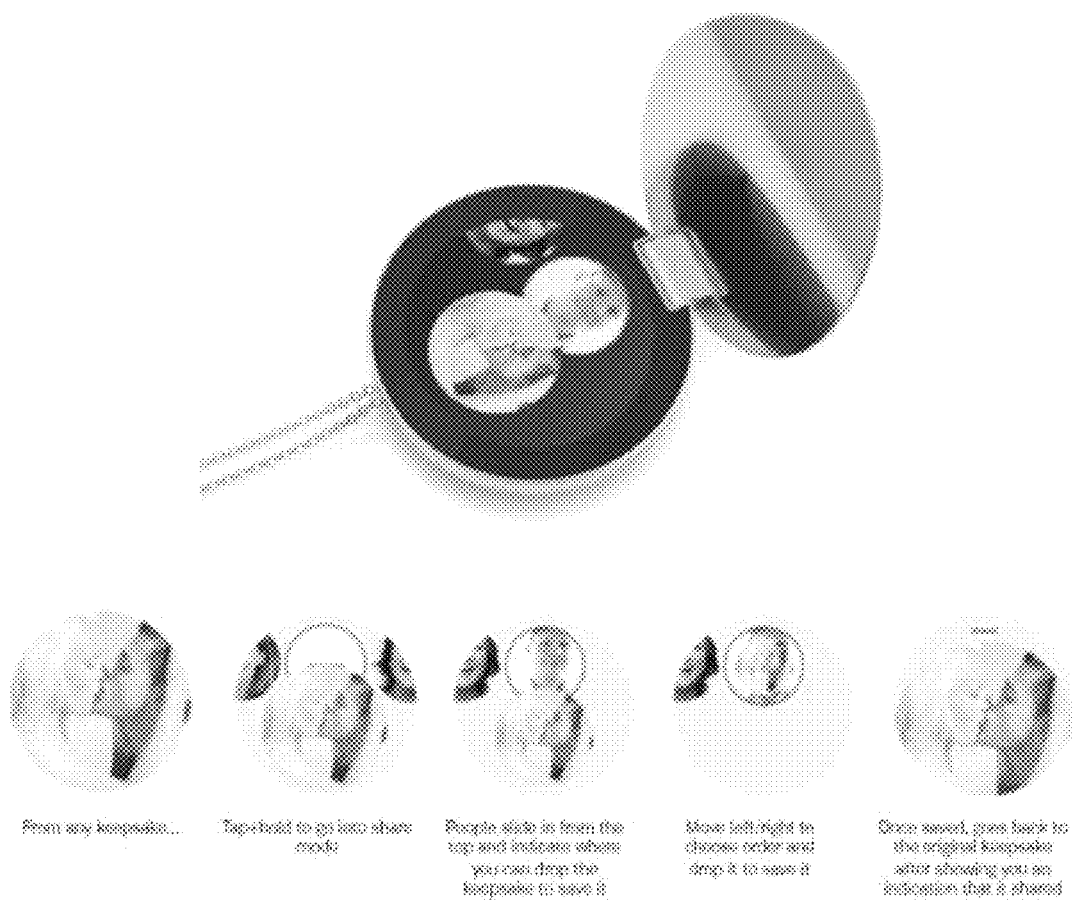
FIG. 17 shows a portion of a user interface of a locket of the present invention for sharing a keepsake.

The user interface of the locket allows gestures to be used to share a keepsake. FIG. 17 shows a portion the user interface of the locket used for sharing a keepsake, in accordance with one embodiment. As described above, in one embodiment, tapping and/or holding a finger on the displayed keepsake puts the locket into the management mode, which allows the user to share the keepsake, among other features. In one embodiment, when the locket is in the management mode, pictures representing individuals connected to the user via the application 25 are displayed at an upper part of the display screen of the locket. The keepsake is reduced in size to make room for these additional pictures. The user may then drag and drop the keepsake on a picture representing an individual with a swipe of the user's fingers on the screen. This movement commands the application to share the keepsake with that individual. Once shared, the keepsake is again displayed on the locket. Other positions of the pictures and of the keepsakes during the management mode are possible.

In addition, the user interface of the locket allows the user to inform the individual who sent the keepsake content, such as an image or text message, that his or her message has been received and that the user is thinking of him or her.

There may be a "like" function on the locket. There may be a different "like" method for photos and messages sent via different social networking services. The locket allows the user to perform one consistent action, e.g., a tap, which sends a "like" action to the application, which then sends that "like" through the service that the application is connected to via the service's API.

With the present application, when receiving a photo from SMS and viewing it on the locket, a "Universal Like" feature enables users to respond to photos sent via SMS. When performing the Universal Like action, preferably a tap, on an image viewed on the locket that was received via SMS, an emoticon in the shape of a heart will be sent to the sender via SMS by the application.

The application 25 includes APIs for multiple communication services, such as social networks like Facebook® and Instagram®. The Universal Like is one of the actions that the user may select by tapping on one of the keepsakes. This feature also works with social networks. For example, if the keepsake content was originally posted on the social network that allows users to "like" a post, by selecting the Universal Like action, the locket commands the application to post "like" the content on that social network via the appropriate API. Other ways to show that the user "liked" the keepsake are possible. After the keepsake is "liked," a confirmation that the keepsake has been "liked" appears on the locket, which may be the heart-shaped icon being displayed on the displayed keepsake. In one embodiment, the heart-shaped icon may be displayed temporarily and after a passing of a predefined time period, the original keepsake is again displayed on the locket. In a further embodiment, the icon is permanently displayed with the keepsake. Other ways to show the Universal Like are possible. Thus, the Universal Like button allows the user to show a "liking" for content that made up the keepsake regardless of what communication service was used to deliver the content to the user.

In general, the connection between the locket and the mobile device running the downloadable application provides a user with an easy way to obtain, customize, and share keepsakes. FIG. 18 is a flow diagram showing a computer-implemented method for creation and manipulation of keepsakes displayed on a digital imagery display locket. Initially, the application running on the user's mobile device receives information from the user about individuals whose content the user wants to turn into keepsakes, thus defining individuals whose content becomes part of the keepsake stream (step 31). Such information may include social network user names, user names used for the application 25, phone numbers, e-mail addresses, and other information to identify these individuals. Content posted on social networks or sent directly to the user is received by the mobile device as part of the keepsake stream (step 32). Such content may include images and text, although other types of content are possible. Each content item in the keepsake stream, which may additionally be a social networking post, e-mail, or SMS message, is turned into a keepsake, and stamped with the data relating to the receipt of the content making up the keepsake, as described above. In a further embodiment, multiple keepsakes may be created out of a single content item. For example, if a social networking post includes multiple images, multiple keepsakes may be created from the multiple images out of that post. Also, if the content item includes an image, filters may be applied to the image, including cropping the image to fit into the locket display, optimizing each image for transfer including reducing file size, and applying visual effects to the image including fitting the image into a frame or a template.

When the user has connected to a person's social network such as Facebook®, Instagram®, SMS, etc. via the application, videos that are shared on the social network are pulled into the application and optimized for display on the locket. Once the video is pulled into the application, it is then processed and turned into an animated GIF with a reduced file size and cropped to be displayed on the locket.

When a Live Photo is shared, the application converts it into an animated GIF and optimizes it for the locket. The application then sends the animated GIF to the locket, which plays it in a continuous loop.

The application automatically crops photos and videos in a way that is best optimized for the locket display. When a source photo or video is pulled into the application, it is analyzed and the crop is determined by people or objects in the photo or video. For example, the photo may be cropped to a group of people in the picture or to a single person. If there are multiple people or objects on opposite sides of the image, it will crop to the largest object, in this case, the largest person, assuming her or she is in the foreground. In one embodiment, the image is cropped to include only the face.

When optimizing a video for the locket, the application analyzes the objects in the video and automatically pans based on primary objects in the video. This includes pans of people in the video, such as a person walking from the left side of the screen to the right side of the screen, and pans of objects in the video, such as a ball rolling down a hill from the top left corner of the frame to the bottom right. In addition, if the image includes multiple faces, the faces may be recognized using one of the known face-recognition techniques and/or information associated with the images, such as Facebook® tags.

If the content includes text, a filter may be applied to the text to change the way it is displayed, such as changing the font and size of the text. If both text and an image are present in a data item, after being processed the text and the photo may be combined into a single keepsake, such as by displaying the typographic representation of the text on the filtered image. If only text is present in the keepsake, the text may also be set in a frame for presentation on the locket. When a message is received by, or inputted into, the application, it is analyzed for keywords and styles. The keywords and styles may be assigned to a font style that allows the application to match the mood style of the words. For example, words written in all caps might result in an extra bold font style to mimic the nature of the content. Another example would be recognizing the word "love," which may be analyzed and converted to a script font.

Each created keepsake is sent to the locket via the wireless connection between the locket and the mobile device of the user (step 34). The method of sending keepsakes and updating the locket is shown in FIG. 18. Upon receiving the keepsake, the locket signals its arrival, such as by flashes of light visible to the user as described above, and displays the keepsake on the display of the locket (step 35). Optionally, the displayed keepsake may be manipulated based on user commands received either through the display of the locket or the mobile device as described above. Also, optionally, based on an analysis of the data about the user and data stamped on the keepsakes, as described above, the application may resend previously sent keepsakes to be displayed on the locket, as described above. Finally, if the locket and the mobile device both remain on and wirelessly connected to each other, the method 30 returns to step 31. If one or both of these devices is off or the devices are not wirelessly connected, such as when out of range of each other, the method 30 ends.

Correlations may be determined by combining multiple services and data by the application. Correlations are determined by combining location services, purchase history, and profiles of people the user is connected to assessed by social media networking services to determine messages that are personal and relevant to the user. For example, the application knows the user is near a store based on location services, that it is the user's mother's birthday based on her profile accessed by the application, and the user's purchase history. The application may then send a new typographic photo to the locket saying "Happy Birthday Mom" and provide additional detail on the application that suggests products in the store based on the user's purchase history preferences.

The application may also allow users to populate photos to their "keepsake" folders using social media, existing photo folders on smartphones and/or photos that are being sent from "invited friends" within the application. Visual recognition software can help analyze and recognize the faces of people, and automatically organize which "keepsake stream" a photo will most likely belong on. The application may use visual insight technology to understand what type of photos users are sharing, saving and posting to their lockets. For example, it can be determined whether users are using the platform mostly for pictures relating to "love" themes, pictures of pets, etc.

The application may also allow users to take photos using a camera function of the user's mobile device. The application may include a filter or mask overlayed on the image being shown by the camera function, such as a circular filter or mask so that the user can see what the keepsake will look like on the locket display.

The application may allow users to build and manage "quick replies." It uses personality insight software to analyze the custom responses of users to get a better understanding of their demographics, including marital status, age, etc. The application may also create "smarter" pre-set quick reply options by understanding what users are saying with custom quick replies.

While the invention has been particularly shown and described as referenced to the embodiments thereof, those skilled in the art will understand that the foregoing and other changes in form and detail may be made therein without departing from the spirit and scope.

What is claimed is:

1. A digital imagery display locket comprising:
a locket case comprising a housing and an openable cover attached to the housing;
a display configured to display digital imagery, the display secured to the housing and configured to be covered by the cover in a closed position;
a processor disposed in the housing and configured to communicate with the display;
a memory disposed in the housing and configured to store data used by the processor to create the digital imagery on the display; and
a wireless transceiver disposed in the housing and configured to wirelessly receive the data and to communicate the data to the processor,
wherein the display comprises a capacitive touchscreen interface configured to permit interaction with the digital imagery and selection of the digital imagery from a portfolio of one or more images, and
wherein the interaction comprises a user's tapping on the digital imagery displayed on the display to present a plurality of available actions, the user's swiping on the plurality of available actions to scroll through the plurality of available actions, and the user's tapping on an action of the plurality of available actions to actuate the action.

2. The digital imagery display locket of claim 1, further comprising a power supply disposed in the housing and configured to supply power to the display.

3. The digital imagery display locket of claim 2, further comprising charging means disposed in the housing and configured to charge the power supply.

4. The digital imagery display locket of claim 3, wherein the charging means is an induction coil, an interface configured to charge via a wired connection to a power source, an interface configured to charge via a USB cable, or an interface configured to charge via a held charge disconnected from a power source.

5. The digital imagery display locket of claim 1, wherein the cover has an outwardly-bended lip and an inner surface comprising a reflective material.

6. The digital imagery display locket of claim 1, wherein the cover has an inner surface and an outer surface, the inner surface including indentations of sufficient depth to permit light from the display to be visible on the outer surface when the cover is in the closed position.

7. The digital imagery display locket of claim 1, further comprising a chain,
wherein the housing includes an indentation and a bar spanning the indentation, and
wherein the chain is fitted between the indentation and the bar.

8. The digital imagery display locket of claim 1, wherein the wireless transceiver is configured to wirelessly receive the data from a smartphone, a tablet computer, a laptop, or a mobile device capable of wireless communication and downloadable software application execution.

9. The digital imagery display locket of claim 8, wherein the wireless transceiver is configured to wirelessly receive the data via a Bluetooth® standard.

10. A system comprising:
an external device capable of wireless communication and downloadable software application execution; and
a digital imagery display locket comprising:
a locket case comprising a housing and an openable cover attached to the housing;
a display configured to display digital imagery, the display secured to the housing and configured to be covered by the cover in a closed position;
a processor disposed in the housing and configured to communicate with the display;
a memory disposed in the housing and configured to store data used by the processor to create the digital imagery on the display; and
a wireless transceiver disposed in the housing and configured to wirelessly receive the data from the external device and to communicate the data to the processor,
wherein the display comprises a capacitive touchscreen interface configured to permit interaction with the digital imagery and selection of the digital imagery from a portfolio of one or more images, and
wherein the interaction comprises a user's tapping on the digital imagery displayed on the display to present a plurality of available actions, the user's swiping on the plurality of available actions to scroll through the plurality of available actions, and the user's tapping on an action of the plurality of available actions to actuate the action.

11. The system of claim 10, further comprising a power supply disposed in the housing and configured to supply power to the display.

12. The system of claim 11, further comprising charging means disposed in the housing and configured to charge the power supply.

13. The system of claim 12, wherein the charging means is an induction coil, an interface configured to charge via a wired connection to a power source, an interface configured to charge via a USB cable, or an interface configured to charge via a held charge disconnected from a power source.

14. The system of claim 10, wherein the external device is a smartphone, a tablet computer, a laptop, or a mobile device capable of wireless communication and downloadable software application execution.

15. The system of claim 10, wherein the locket is configured to wirelessly receive the data from the external device via a downloadable software application executed by the external device.

16. The system of claim 15, wherein the locket is configured to permit a user to interact with the digital imagery displayed on the display via the downloadable software application.

17. A method of displaying digital imagery on a digital imagery display locket, comprising:
wirelessly transmitting data from an external device to a digital imagery display locket; and
displaying the data as digital imagery on a display of the digital imagery display locket;
wherein the external device is capable of wireless communication and downloadable software application execution, and
wherein the digital imagery display locket comprises:
a locket case comprising a housing and an openable cover attached to the housing;
a display configured to display the digital imagery, the display secured to the housing and configured to be covered by the cover in a closed position;
a processor disposed in the housing and configured to communicate with the display;
a memory disposed in the housing and configured to store data used by the processor to create the digital imagery on the display; and
a wireless transceiver disposed in the housing and configured to wirelessly receive the data from the external device and to communicate the data to the processor,
wherein the display comprises a capacitive touchscreen interface configured to permit interaction with the digital imagery and selection of the digital imagery from a portfolio of one or more images, and
wherein the interaction comprises a user's tapping on the digital imagery displayed on the display to present a plurality of available actions, the user's swiping on the plurality of available actions to scroll through the plurality of available actions, and the user's tapping on an action of the plurality of available actions to actuate the action.

18. The method of claim 17, wherein the locket wirelessly receives the data from the external device via a downloadable software application executed by the external device.

19. The method of claim 18, wherein the locket permits a user to interact with the digital imagery displayed on the display via the downloadable software application.

* * * * *